July 26, 1938.  V. W. KLIESRATH  2,124,781

CLUTCH CONTROL MECHANISM

Original Filed Aug. 28, 1931

INVENTOR
VICTOR W. KLIESRATH
BY
H. V. Clayton
ATTORNEY

Patented July 26, 1938

2,124,781

UNITED STATES PATENT OFFICE 2,124,781

CLUTCH CONTROL MECHANISM

Victor W. Kliesrath, South Bend, Ind., assignor to Bragg-Kliesrath Corporation, South Bend, Ind., a corporation of New York Original application August 28, 1931, Serial No. 559,990. Divided and this application February 3, 1937, Serial No. 123,748

1 Claim. (Cl. 251—76)

This invention relates to clutch controls, and is illustrated as embodied in a vehicle such as an automobile arranged to permit of quicker clutch engagement when in high than in low gear, thereby giving a soft and easy engagement of the clutch in low gear without interfering with rapid and smooth engagement in high gear.

While not in all its features necessarily so limited, the invention is especially advantageous in controlling the actuation, and especially the engagement, of a power-actuated clutch, and is illustrated as a vacuum-operated clutch actuated by the suction of the intake manifold, and preferably controlled by the accelerator, which also operates the engine throttle.

The most important feature of the invention relates to the provision of a simple type of bleed valve for controlling the clutch engaging operation of the aforementioned power means.

The particular arrangement shown in the drawing gives relatively rapid engagement of the clutch in high speed (direct drive), and relatively slow engagement in low speed and in reverse.

Other objects of the invention and desirable details of construction and combinations of parts will become apparent from the following description of a preferred embodiment, which description is taken in conjunction with the accompanying drawing, in which.

Figure 1:
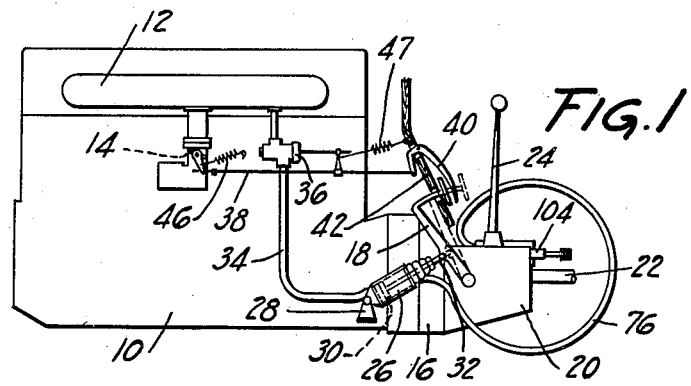
Figure 1 is a side elevation of so much of an automobile as shows the engine, clutch, and change-speed transmission, together with a preferred embodiment of my invention.

In the arrangement of Figures 1-4, the automobile chassis includes the usual engine 10 having an intake manifold 12 controlled by a throttle 14, the usual clutch 16 operable manually, if desired, by means such as a clutch pedal 18, and the usual change-speed transmission 20 driving the propeller shaft 22 and having a gear shift lever 24.

The clutch is preferably operated by vacuum power from the suction of the intake manifold 12, there being shown a power cylinder 26 pivoted on a bracket 28 carried by the chassis frame, and containing a piston 30 having a piston rod 32 extending through a closure forming the top of cylinder 26 and which is pivotally connected to the clutch pedal 18. The cylinder 26 is connected alternatively to the manifold 12 or to the atmosphere, through a conduit 34 controlled by a valve 36, shown in detail in Figure 4.

Valve 36 is operatively connected to a rod 38 connected to the accelerator pedal 40 pivoted on the floorboard 42, and which rod also has a lost-motion connection with the throttle 14. The lost-motion connection insures the operation of the valve either before the throttle is opened or after the same is closed. With the parts as shown, when the accelerator pedal is released, a return spring 46 closes the throttle to idling position and a return spring 47 opens the valve 36 to establish communication between the manifold 12 and the cylinder 26, thereby causing piston 30 to disengage the clutch. When the accelerator pedal is depressed, the throttle is opened and cylinder 26 is connected to atmosphere, thereby permitting the usual clutch spring to cause the clutch to engage as rapidly as air can escape from the space between piston 30 and the closure at the top of cylinder 26.

The valve 36 includes a casing 50 having an inlet 52 communicating with the intake manifold and having an outlet 54 communicating through conduit 34 with the cylinder 26. The casing also has openings 56 communicating with the atmosphere and protected by a cup-shaped baffle 58 held by a nut 60 formed with a passage for the operating connection 62.

Figures 2, 4:
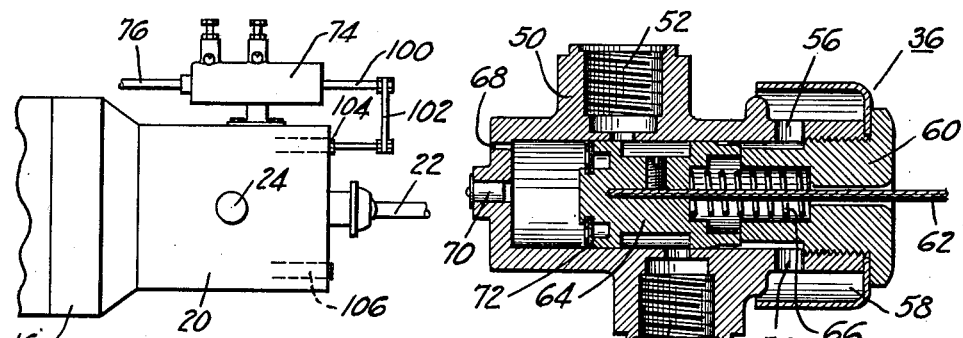
Figure 2 is a top plan view of the transmission of Figure 1, and its associated parts.
Figure 4 is a section through the accelerator-controlled clutch-controlling valve of Figure 1.

The connection 62 operates a valve piston 64, against the resistance of a return spring 66, to connect the outlet 54 with the inlet 52, when in its right-hand position as shown in Figure 4, this being the position with the accelerator released and the throttle closed and the clutch disengaged, spring 47 being sufficiently stronger than spring 66 to cause such action.

When the accelerator 40 is depressed, spring 66 shifts the valve piston to the left to connect the outlet 54 to the openings 56, thereby permitting the clutch spring to cause the clutch to engage. The valve casing has an opening 68 to permit escape of the air ahead of the valve piston during this movement.

In order to make opening 68 small enough to have a dashpot action, slowing up the valve movement during engagement of the clutch, without restricting its movement in the opposite direction to disengage the clutch, the casing may also be provided with an inwardly-opening check valve 70. The valve piston may also be provided with a friction disk 72 which also serves to graduate and control its movement in a direction to cause clutch engagement.

According to an important feature of the present invention, the actuation of the clutch is controlled, in this particular instance the control being for the purpose of insuring smoothness of engagement, by means controlled by and preferably mounted on the transmission 20 or its equivalent. I prefer to use for this purpose a novel valve 74 shown in detail in Figure 3, and which is connected by means such as a conduit 76 with the top of cylinder 26, to control the escape of the air trapped between piston 30 and the closure at the top of the cylinder 26, and thereby control the dashpot action of the cylinder in graduating the engagement of the clutch.

Figure 3:
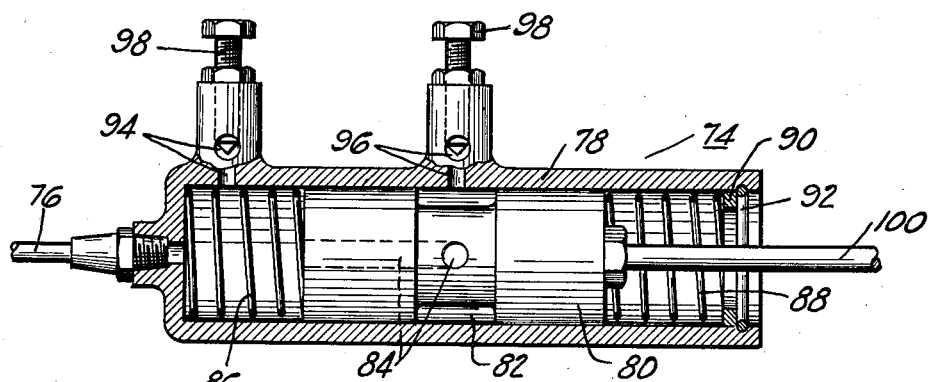
Figure 3 is a section through the transmission-mounted clutch-controlling valve of Figures 1 and 2.

The particular valve shown in Figure 3 includes a casing 78, open at its rear end, in which is arranged a valve piston 80 having an annular space 82 communicating by passages 84 with the space ahead of the valve piston. A spring 86 is arranged between the valve piston 80 and the head of the casing 78, and a balancing spring 88 is confined between the valve piston and a washer 90 held by a snap-ring 92 in the open end of the casing. The valve piston is normally in the central or "neutral" position shown.

The valve casing has two air inlets 94 and 96, adjustably controlled by needle valves 98, if desired, the inlet 94 being continuously in communication with conduit 76 and the inlet 96 being in communication therewith only in the central or "neutral" position shown and being cut off therefrom by shifting the valve piston in either direction.

The valve piston 80 is connected, by means such as a rod 100 and a rigid crosshead 102, to one of the usual two parallel movable and lengthwise-slidable gear shift rods or equivalent members 104 and 106, controlled as usual by a driver-operated member such as the gear shift lever 24.

In the usual arrangement of the parts, gear shift lever 24 moves member 104 forward for low gear and rearward for reverse, member 106 being in neutral; or it moves member 106 rearward for second speed and forward for high (direct drive), member 104 being in neutral. All passenger cars and most trucks today use this shift.

In the illustrated arrangement, the valve piston 80 is connected to the shift member 104, so that when this member is in neutral (i. e. while member 106 is being used, with the gears either in second or in high) both inlets 94 and 96 are in communication with conduit 76, permitting relatively rapid clutch engagement, or at least engagement which is not as slow as when inlet 96 is cut off. If, however, the gear shift lever 24 is manipulated to shift into either low or reverse, by moving shift member 104 one way or the other from neutral, inlet 96 is cut off and the clutch engagement is slowed up correspondingly to give the slower action desirable at the low speeds.

The invention heretofore described is disclosed in my copending application Serial No. 559,990, filed August 28, 1931, this application constituting a division thereof.

While one illustrative embodiment has been described, it is not my intention to limit the scope of the invention to that particular embodiment, or otherwise than by the terms of the appended claim.

I claim:

A valve for controlling a clutch or the like comprising a casing having an inlet opening, two outlet openings in its side, a floating spool-shaped valve piston provided with a port in its small-diametered waist portion connected with a duct extending through one of the full-bodied end portions thereof, and yieldable means for normally positioning said piston to interconnect all of said openings, two of said openings being connected by means of said port and duct.

VICTOR W. KLIESRATH.